United States Patent

Prisser et al.

(10) Patent No.: US 9,560,053 B2
(45) Date of Patent: Jan. 31, 2017

(54) PARENTAL CONTROL MANAGEMENT AND ENFORCEMENT BASED ON HARDWARE IDENTIFIERS

(71) Applicant: Verizon Patent and Licensing Inc., Arlington, VA (US)

(72) Inventors: Laura D. Prisser, Sacramento, CA (US); Jude M. Munn, Pittsburg, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 8 days.

(21) Appl. No.: 14/485,190

(22) Filed: Sep. 12, 2014

(65) Prior Publication Data

US 2016/0080322 A1    Mar. 17, 2016

(51) Int. Cl.
  *G06F 17/00* (2006.01)
  *H04L 29/06* (2006.01)
(52) U.S. Cl.
  CPC .................. *H04L 63/102* (2013.01)
(58) Field of Classification Search
  CPC ..... H04L 63/0245; H04L 63/20; H04L 63/102
  USPC ............................................................. 726/1
  See application file for complete search history.

(56) References Cited

U.S. PATENT DOCUMENTS

| 7,428,585 B1* | 9/2008 | Owens, II ........... G06F 21/6218 709/223 |
| 2006/0174078 A1* | 8/2006 | Robison ................. G06F 9/468 711/163 |
| 2013/0017806 A1* | 1/2013 | Sprigg .................... H04M 1/66 455/411 |

* cited by examiner

*Primary Examiner* — Mohammad W Reza

(57) ABSTRACT

A device may receive a first indication that a user device connected to a first network device associated with a first network, the first indication including a hardware identifier associated with the user device; identify a policy set associated with the hardware identifier; and output the policy set to the first network device. The outputting may cause the first network device to filter traffic, transmitted via the first network device and destined for the user device, in accordance with the policy set. The device may receive a second indication that the user device has connected to a second network device associated with a second network; and output the policy set to the second network device. The outputting may cause the second network device to filter traffic, transmitted via the second network device and destined for the user device, in accordance with the policy set.

20 Claims, 13 Drawing Sheets

321

| Account | Master User | "Child" Users |
|---|---|---|
| Account 1 | M-A | A, B, C |
| Account 2 | M-B | D, E, F |

| User | Device Identifiers | Policy Set |
|---|---|---|
| A | Dev_A; Dev_B | Policy Set A |
| B | Dev_C; Dev_D | Policy Set B |
| C | Dev_E | Policy Set C |

Fig. 3C

PARENTAL CONTROL MANAGEMENT AND ENFORCEMENT BASED ON HARDWARE IDENTIFIERS

BACKGROUND

User devices, such as smartphones, tablet computers, laptop computers, etc., may access content via webpages, applications, etc. Parental controls are sometimes implemented on a child's user device to prevent the user device from receiving content (e.g., content that may be inappropriate for children).

BRIEF DESCRIPTION OF THE DRAWINGS

FIG. 3B illustrates an example data structure that stores information identifying child users associated with a master user;

FIG. 3C illustrates an example data structure that stores information identifying policy sets based on device identifiers of user devices associated with individual users;

DETAILED DESCRIPTION OF THE PREFERRED EMBODIMENTS

The following detailed description refers to the accompanying drawings. The same reference numbers in different drawings may identify the same or similar elements.

Parental controls on user devices may be difficult to manage when a user (e.g., a child user) is associated with multiple user devices. Parental controls are typically enforced by a network device (e.g., a router) in order to block inappropriate content to user devices connected to the router. The parental controls can be circumvented when a user device accesses content via a different router that does not store the parental controls, or when the user device accesses content via a wireless telecommunications network (e.g., a cellular network) and independently of the router.

Systems and/or methods, as described herein, may output hardware identifiers of user devices connected to a router, and may provide the router with policies (e.g., parental controls) based on the hardware identifiers. The router may then apply the parental controls to traffic destined for the user devices connected the router. In some implementations, a consistent set of parental controls may be applied to a group of user devices associated with a particular user. In some implementations, the parental controls may also be provided to a policy enforcement component associated with a cellular network. As a result, the same set of parental controls may be enforced regardless of whether the user device communicates via a wireless telecommunications network (e.g., a cellular network) or a local network associated with the router.

Figure 1:
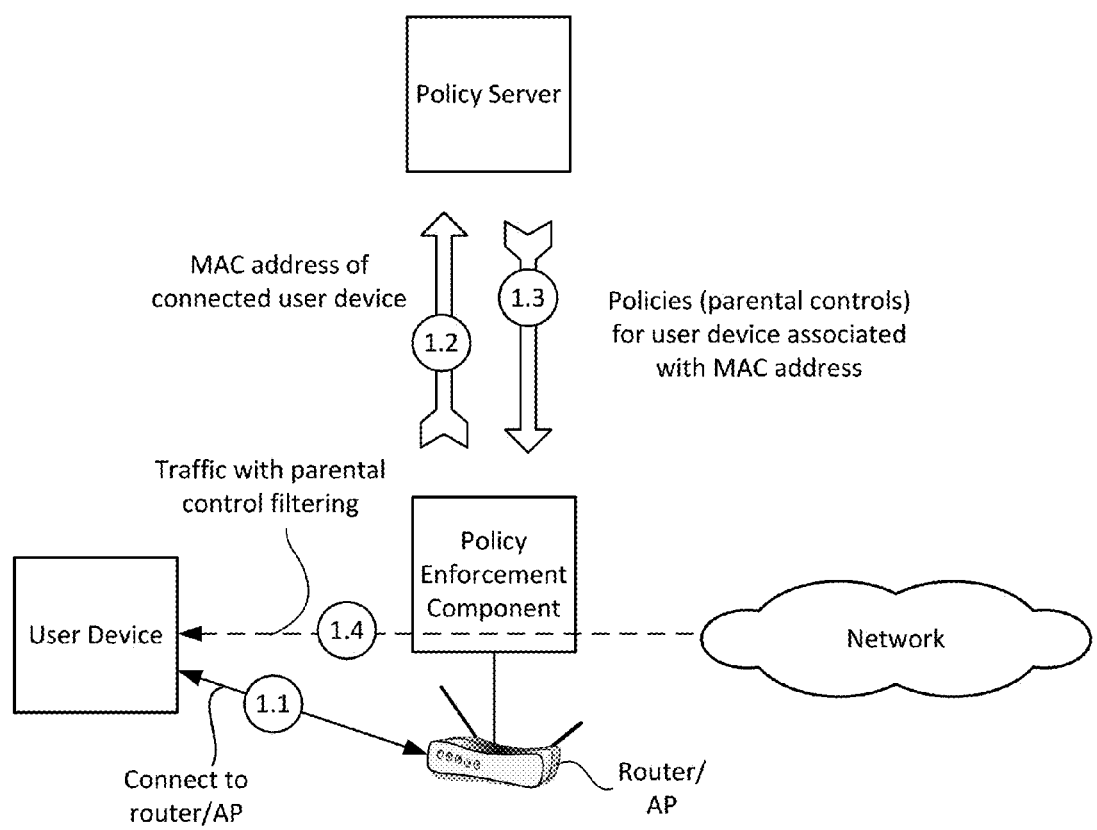
FIG. 1 illustrates an example overview of an implementation described herein.

FIG. 1 illustrates an example overview of an implementation described herein. As shown in FIG. 1, a user device may connect to a router/access point (AP) associated with a local network, such as a home network (arrow 1.1). A policy enforcement component of the router/AP may output, to a policy server, a hardware identifier of the user device, such as a media access control (MAC) address (arrow 1.2). Based on receiving the MAC address, the policy server may identify a set of policies (e.g., parental control policies) that should be applied to traffic destined for that particular user device (e.g., policies to block traffic from particular websites, applications, etc.). Other user devices (e.g., user devices associated with the users) may have different parental control policies. The policy server may output information regarding the parental control policies to the policy enforcement component (arrow 1.3). The policy enforcement component may then filter traffic destined to the user device based on the parental control policies (arrow 1.4).

As a result, parental controls may be applied to traffic destined for the user device based on the hardware identifier (e.g., MAC address) of the user device. Also, the same set of parental controls may be applied if the user device connects to a different router/AP associated with a different home network (e.g., since the different router/AP may obtain the parental controls, from the policy server, for the user device based on the user device's MAC address).

As described in greater detail below, a user of the user device (or a parent or guardian of the user) may define parental controls for the user device via a portal or application associated with the policy server. Also, the policy server may "push" parental control policies to a wireless policy enforcement component so that the same parental controls are applied when the user device disconnects from a local network and instead sends and/or receives traffic via a cellular network. In some implementations, a set of parental controls may be applied to a group of user devices associated with an individual user. For example, a set of parental controls may be applied to an individual user's mobile phone, gaming console, laptop computer, desktop computer, etc.

Figure 2:
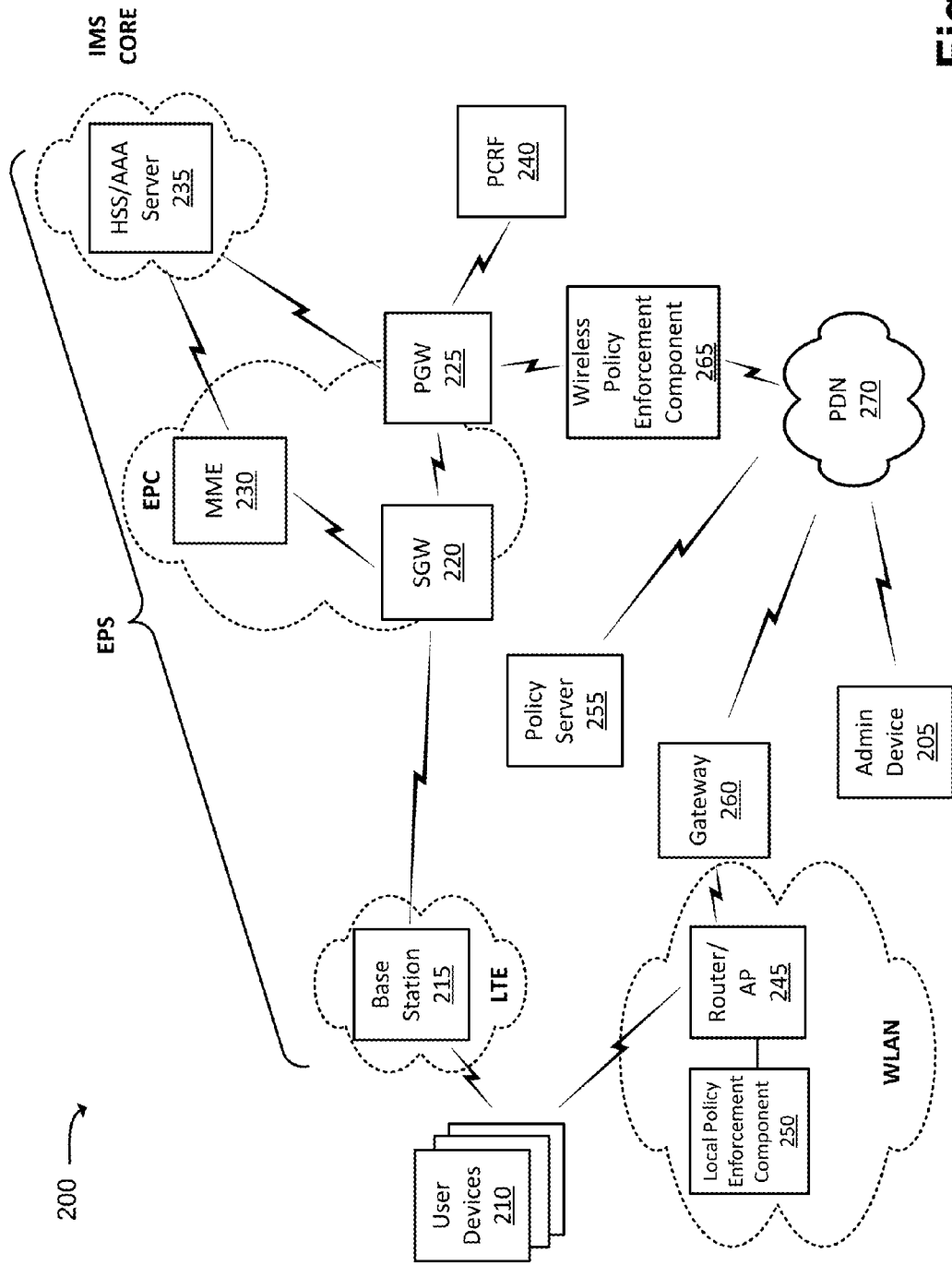
FIG. 2 illustrates an example environment in which systems and/or methods, described herein, may be implemented.

FIG. 2 illustrate example environment 200, respectively, in which systems and/or methods described herein may be implemented. As shown in FIG. 2, environment 200 may include administrative ("admin") device 205, user devices 210 (hereinafter sometimes individually referred to as "user device 210"), base station 215, serving gateway ("SGW") 220, packet data network ("PDN") gateway ("PGW") 225, mobility management entity device ("MME") 230, home subscriber server ("HSS")/authentication, authorization, accounting ("AAA") server 235 (hereinafter referred to as "HSS/AAA server 235"), policy charging and rules function ("PCRF") 240, router/AP 245, local policy enforcement component 250, policy server 255, gateway 260, wireless policy enforcement component 265, and PDN 270.

Environment 200 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 210, some or all of which may take the form of an evolved node B ("eNB"), via which user device 210 may communicate with the EPC network. The EPC network may include one or more SGWs 220, PGWs 225, and/or MMEs 230, and may enable user device 210 to communicate with PDN 270 and/or an Internet protocol ("IP") multimedia subsystem ("IMS") core network. The IMS core network may include HSS/AAA server 235, and may manage authentication, session initiation, account information, a user profile, etc., associated with user devices 210.

Admin device 205 may include a computation and communication device that is capable of communicating with PDN 270. For example, admin device 205 may include a desktop computing device, and/or a portable computing device (e.g., a laptop and/or tablet computing device). A user may access an interface (e.g., a web portal) of policy server 255 via admin device 205 to provide parental control rules/policies to enforce for particular user devices 210. For example, the user may use admin device 205 to log in to the portal and define parental controls for particular user devices 210 (e.g., parental controls for user devices 210 associated with the user's children).

User device 210 may include a computation and communication device, such as a wireless mobile communication device that is capable of communicating with base station 215 and/or PDN 270. For example, user device 210 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 210 may send traffic to and/or receive traffic from PDN 270 via base station 215, SGW 220, and/or PGW 225.

Base station 215 may include one or more network devices that receive, process, and/or transmit traffic, such as calls, audio, video, text, and/or other data, destined for and/or received from user device 210. In one example, base station 215 may be an eNB device and may be part of the LTE network. Additionally, or alternatively, one or more other base stations 210 may be associated with a RAN that is not associated with the LTE network (e.g., a wireless hot spot, a wireless access point, etc.). Base station 215 may receive traffic from and/or send traffic to user device 210 via SGW 220, PGW 225, gateway 260, and/or PDN 270. Base station 215 may send traffic to and/or receive traffic from user device 210 via, for example, an air interface (e.g., a cellular air interface).

SGW 220 may include one or more network devices that gather, process, search, store, and/or provide information in a manner described herein. SGW 220 may, for example, aggregate traffic received from one or more base stations 210 and may send the aggregated traffic to PDN 270 via PGW 225.

PGW 225 may include one or more network devices that gather, process, search, store, and/or provide information in a manner described herein. PGW 225 may aggregate traffic received from one or more SGWs 220, etc. and may send the aggregated traffic to PDN 270. PGW 225 may also, or alternatively, receive traffic from PDN 270 and may send the traffic toward user device 210 via base station 215, SGW 220, and/or gateway 260.

MME 230 may include one or more computation and communication devices that perform operations to register user device 210 with the EPS, to establish bearer channels associated with a session with user device 210, to hand off user device 210 from the EPS to another network, to hand off user device 210 from the other network to the EPS, and/or to perform other operations. MME 230 may perform policing operations on traffic destined for and/or received from user device 210.

HSS/AAA server 235 may include one or more devices that manage, update, and/or store, in a memory associated with HSS/AAA server 235, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 210); information regarding services to which particular subscribers are subscribed (e.g., communication services, such as video conferencing services, voice chat services, etc.); and/or other information. Additionally, or alternatively, HSS/AAA server 235 may perform authentication, authorization, and/or accounting operations associated with the subscriber and/or a communication session with user device 210.

PCRF 240 may include one or more devices that aggregate information to and from the EPC network and/or other sources. PCRF 240 may receive information regarding policies and/or subscriptions from one or more sources, such as subscriber databases and/or from one or more users (such as, for example, an administrator associated with PCRF 240). In some implementations, PCRF 240 may store parental control policies for user devices 210.

Router/AP 245 may include one or more devices that receive, process, and/or transmit traffic to and/or from user device 210. Router/AP 245 may implement, or be used to implement, a wireless local area network ("WLAN"). For example, router/AP 245 may send traffic to and/or receive traffic from user device 210 via an air interface, and may forward traffic, associated with user device 210, to and/or from PDN 270. The air interface between user device 210 and router/AP 245 may correspond to a frequency band that is not associated with cellular communication (e.g., an unlicensed frequency band, which has not been licensed by a governmental entity). For instance, the air interface between user device 210 may correspond to a Wi-Fi technology (e.g., an Institute of Electrical and Electronics Engineers Institute of Electrical and Electronics Engineers ("IEEE") 802.11-based technology), a Bluetooth® technology, and/or another wireless communication technology. In some implementations, router/AP 245 may include, or may be associated with, a router, a switch, and/or another type of networking device.

Local policy enforcement component 250 may include one or more devices that may implement policies when transmitting traffic to and/or from user device 210 via router/AP 245. For example, local policy enforcement component 250 may implement parental control policies to block particular content from particular webpages and/or applications. In some implementations, local policy enforcement component 250 may be implemented as part of router/AP 245 (e.g., via software or as an integrated hardware module). Additionally, or alternatively, some or all of local policy enforcement component 250 may be implemented separately from router/AP 245 (e.g., on a separate hardware device).

Policy server 255 may include one or more server devices that may store parental control policies for particular users and their respective user devices 210. Policy server 255 may store parental controls for user device 210 based on a hardware identifier of user device 210 (e.g., a MAC address and/or another identifier). Policy server 255 may receive parental control policies from admin device 205, and may output information regarding the parental controls to local policy enforcement component 250 and/or wireless policy enforcement component 265.

Gateway 260 may include one or more devices that receive, process, and/or transmit traffic between router/AP 245 and PDN 270. For example, gateway 260 may be, and/or may include, a device that receives signals from PDN 270 (e.g., a modem) via a coaxial and/or a fiber interface, and outputs corresponding digital signals to router/AP 245. For example, gateway 260 may include a wired interface (e.g., an Ethernet interface) via which signals are sent to and/or received from router/AP 245. In some implementations, router/AP 245, local policy enforcement component 250, and gateway 260 may be implemented as a single, integrated device.

Wireless policy enforcement component 265 may include one or more server devices that may implement policies when transmitting traffic to and/or from user device 210 via a base station 215. For example, wireless policy enforcement component 265 may implement parental control policies to block particular content from particular webpages and/or applications. In some implementations, wireless policy enforcement component 265 may be implemented as part of PGW 225 and/or PCRF 240. Additionally, or alternatively, some or all of wireless policy enforcement component 265 may be implemented separately from PGW 225 and/or PCRF 240.

PDN 270 may include one or more wired and/or wireless networks. For example, PDN 270 may include an IP-based PDN, a wide area network ("WAN") such as the Internet, a core network of a telecommunications provider, a private enterprise network, and/or one or more other networks. User device 210 may connect, through PGW 225, to data servers, application servers, other user devices 210, and/or to other servers or applications that are coupled to PDN 270.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
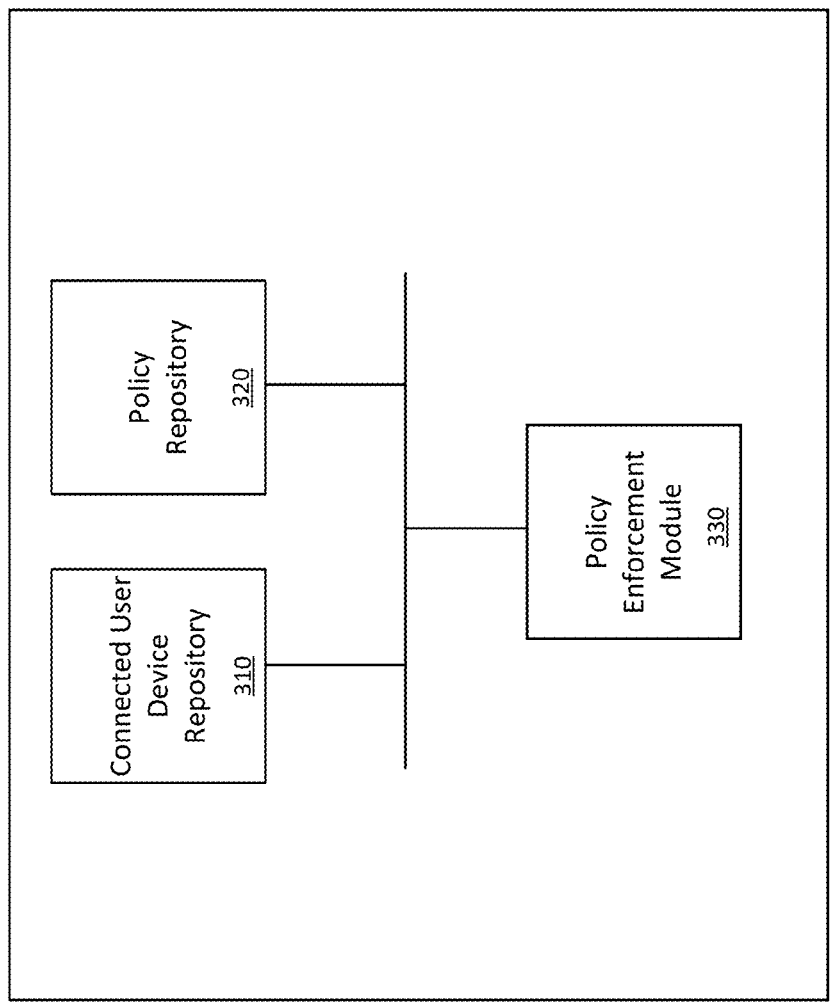
FIG. 3A illustrates example functional components of a local policy enforcement component.

FIG. 3A illustrates example functional components of local policy enforcement component 250. In some implementations, the functional components shown in FIG. 3A may be implemented as part of another device in environment 200, such as wireless policy enforcement component 265.

As shown in FIG. 3A, local policy enforcement component 250 may include connected user device repository 310, policy repository 320, and policy enforcement module 330. Connected user device repository 310 may store information identifying user devices connected to router/AP 245. For example, connected user device repository 310 may store hardware identifiers (e.g., MAC addresses and/or other identifiers) of user devices 210 connected to router/AP 245. In some implementations, router/AP 245 may provide the hardware identifiers to local policy enforcement component 250 (e.g., at periodic intervals, and/or as user devices 210 connect and disconnect from router/AP 245). Connected user device repository 310 may output the hardware identifiers to policy server 255.

Policy repository 320 may store policy sets (e.g., parental control policy sets) for user devices 210. In some implementations, a policy set may be associated with a hardware identifier of a particular user device 210. In some implementations, a policy set may identify content that a particular user device 210 may or may not receive (e.g., content from particular webpages and/or applications). Policy repository 320 may receive policy sets from policy server 255. Example information stored by policy repository 320 is described with respect to FIGS. 3B and 3C.

Referring to FIG. 3B, data structure 321 may store information identifying users associated with different user accounts (e.g., user accounts associated with network services, such as home internet services, telecommunication cellular services, etc.). For example, data structure 321 may store information identifying a "master" user (e.g., an account owner, an administrative user, etc.) and "child" users (e.g., users associated with the master user users for which parental controls may be defined). Information stored by data structure 321 may be stored during an account setup or on-boarding process when the master user sets up an account associated with network services.

Referring to FIG. 3C, data structure 322 may store information identifying particular users, device or hardware identifiers (e.g., a MAC address, an international mobile subscriber identifier (IMSI), an international mobile equipment identifier (IMEI), and/or other identifiers) of user devices 210 associated with the particular users, and policy sets associated with the particular users. As described in greater detail below, information stored by data structure 322 may be based on policy sets or parental controls defined by a master user (e.g., parent associated with particular child users). In some implementations, some or all of information stored by data structures 321 and 322 may be stored by policy repository 320.

Returning to FIG. 3A, policy enforcement module 330 may enforce policy sets by filtering traffic transmitted to user device 210 via router/AP 245. For example, policy enforcement module 330 may identify a policy set associated with a user device 210 that is connected to router/AP 245 (e.g., based on information stored by connected user device repository 310 and policy repository 320). Policy enforcement module 330 may block traffic, destined for user device 210, based on information included in a policy set associated with user device 210. Additionally, or alternatively, policy enforcement module 330 may block a request (e.g., an HTTP GET request), from user device 210, to access content that user device 210 is not permitted to access.

In some implementations, some or all of the functional blocks shown in FIG. 3A may be implemented by wireless policy enforcement component 265. For example, wireless policy enforcement component 265 may include policy repository 320 and/or policy enforcement module 330. As described in greater detail below, wireless policy enforcement component 265 may identify a policy set for user device 210 based on a hardware identifier of user device 210 and information stored by policy repository 320. Policy enforcement module 330 of wireless policy enforcement component 265 may filter traffic destined to user device 210 based on the policy set. In some implementations, a sync operation may be performed to synchronize information included in policy repository 320 of local policy enforcement component 250 and wireless policy enforcement component 265. For example, each policy repository 320 of local policy enforcement component 250 and wireless policy enforcement component 265 may include a copy of information stored by data structures 321 and 322.

Figure 4:
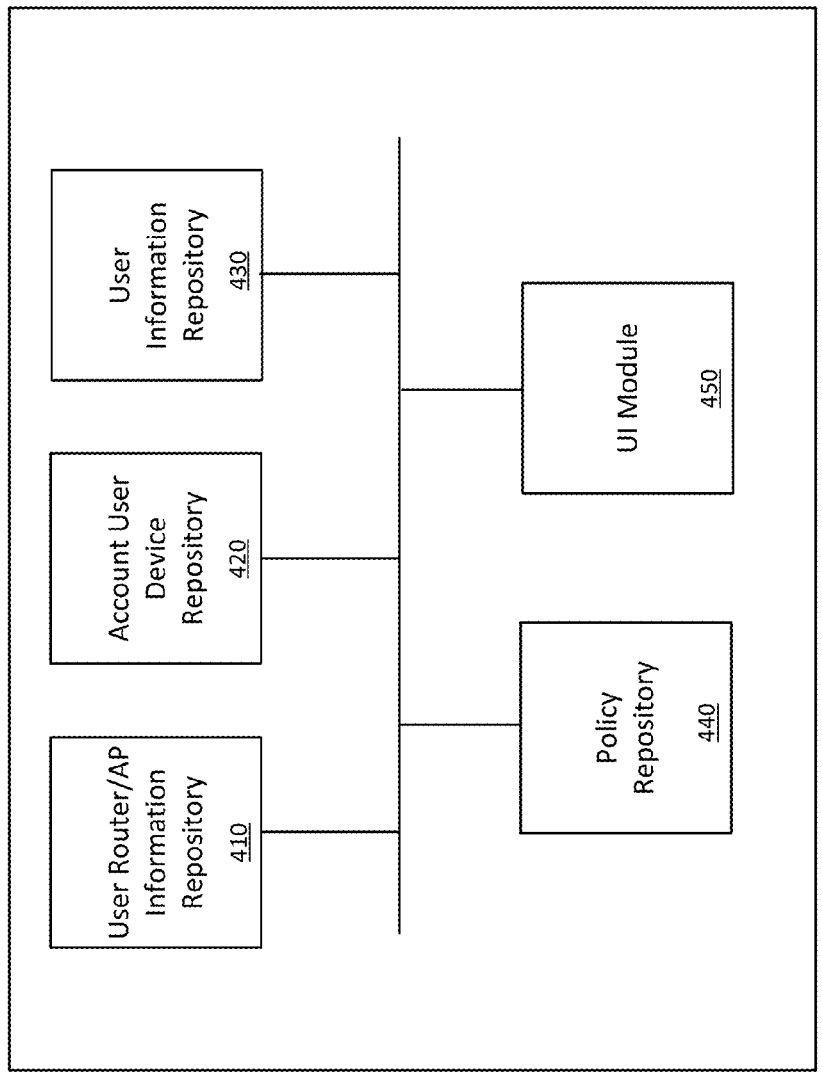
FIG. 4 illustrates example functional components of a policy server.

FIG. 4 illustrates example functional components of a policy server. In some implementations, the functional components shown in FIG. 4 may be implemented as part of another device in environment 200.

As shown in FIG. 4, policy server 255 may include user router/AP information repository 410, account user device repository 420, user information repository 430, policy repository 440, and UI module 450. User router/AP information repository 410 may store information identifying a particular local policy enforcement component 250 associated with a particular user. For example, user router/AP information repository 410 may store information identifying a hardware identifier of the particular local policy enforcement component 250, an IP address of the particular local policy enforcement component 250, and/or other information identifying the particular local policy enforcement component 250. Additionally, or alternatively, user router/AP information repository 410 may store information that may be used to communicate with local policy enforcement component 250 (e.g., an IP address of local policy enforcement component 250, authentication credentials, etc.). As described in greater detail below in FIG. 5, information stored by user router/AP information repository 410 may be used to determine a particular local policy enforcement component 250 associated with a particular user.

Account user device repository 420 may store information identifying cellular user devices 210 associated with a particular account (e.g., a cellular account). For example, account user device repository 420 may store information identifying user devices 210 (e.g., smart phones, tablets, etc.) that may communicate via base station 215. In some implementations, account user device repository 420 may store a list of hardware identifiers of the user devices 210 associated with the particular account.

User information repository 430 may store information identifying particular users associated with a particular user account. For example, user information repository 430 may store information identifying an account manager, family members, and/or other individuals associated with a particular cellular account. Information identifying users associated with the user account may be initially defined during an account setup or account on-boarding process when a user subscribes to network connectivity services (e.g., home internet connectivity services, cellular network services, or the like). As described below, information stored by user information repository 430 may be used to link particular users with particular user devices 210.

Policy repository 440 may store policies (e.g., parental control policies) associated with particular user devices 210 (e.g., user devices 210 associated with a particular cellular account and/or user devices 210 connected to a particular router/AP 245). Policy repository 440 may also store policies associated with particular users. In some implementations, policy repository 440 may receive a set of policies for user device 210 (or a group of user devices 210 associated with a particular user) via UI module 450. Policy repository 440 may output the policies to local policy enforcement component 250 and/or wireless policy enforcement component 265. In some implementations, information stored by policy repository 440 may correspond to information stored in data structures 321 and 322. In some implementations, policy repository 440 may store information from multiple local policy enforcement components 250 associated with different sets of users.

UI module 450 may include a portal, an application, and/or another system to interface with a user via admin device 205. As described in greater detail below, the user may access policy server 255 via UI module 450 and provide policy server 255 with policies for particular user devices 210 associated with the user (e.g., policies for user devices 210 associated with a cellular account of the user and/or for user devices 210 connected to a router/AP 245 associated with the user).

Figure 5:
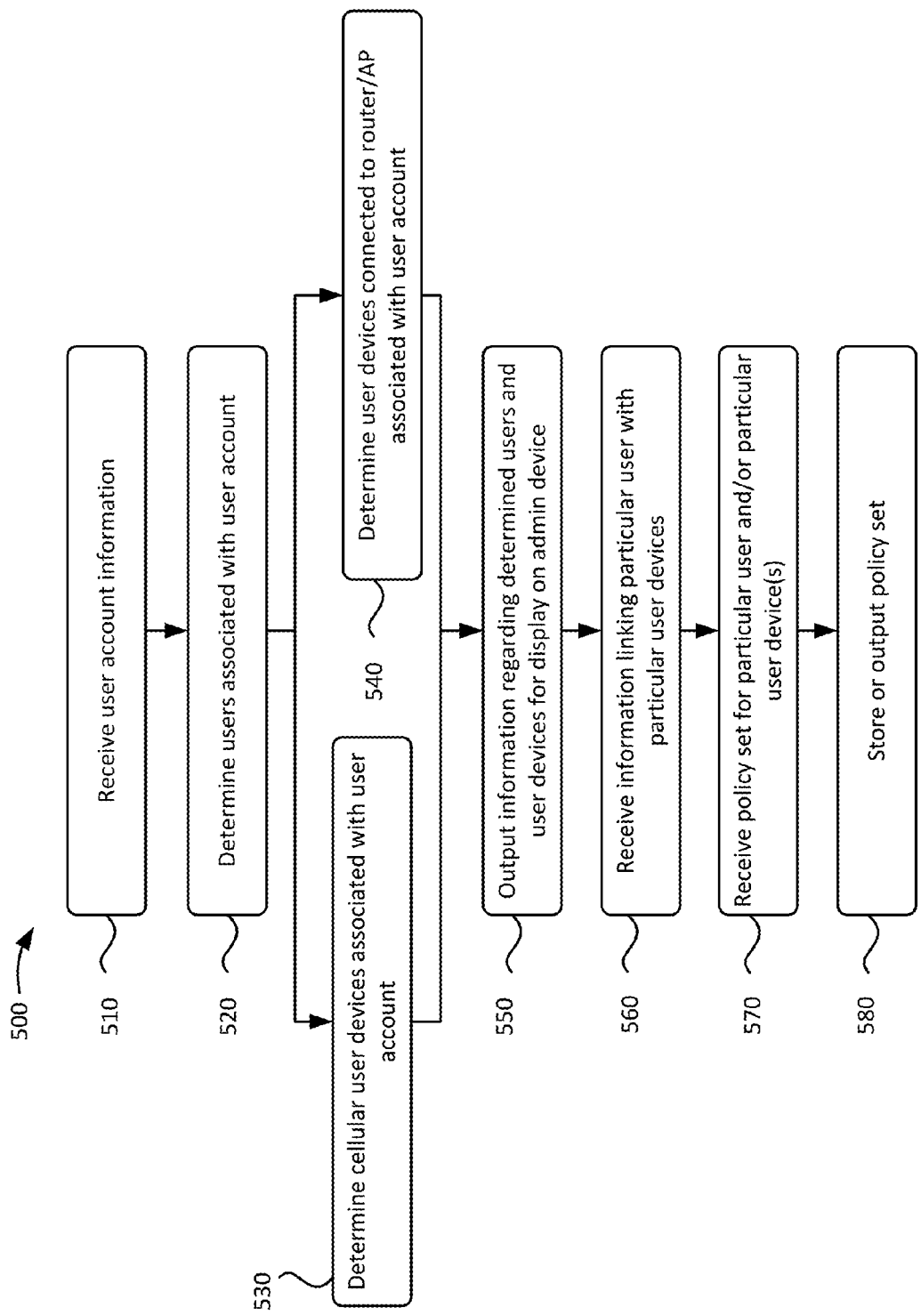
FIG. 5 illustrates a flowchart of an example process for defining parental controls to particular users and user devices.

FIG. 5 illustrates a flowchart of an example process 500 for assigning parental controls to particular users and user devices. In some implementations, process 500 may be performed by policy server 255 (e.g., in conjunction with admin device 205). In some implementations, some or all of blocks of process 500 may be performed by one or more other devices.

As shown in FIG. 5, process 500 may include receiving user account information (block 510). For example, policy server 255 may receive user account information from admin device 205 via a portal or application associated with UI module 450 of policy server 255. In some implementations, policy server 255 may receive the user account information when a user of admin device 205 logs in to the user account to view, modify, or define parental controls for user devices 210 associated with the user account. For example, the user of admin device 205 may log in to a web page or portal associated with policy server 255 using login credentials that identify the user account.

Process 500 may further include determining users associated with the user account (block 520). For example, policy server 255 may determine users associated with the user account based on the user account information received in block 510 and information stored by user information repository 430. Information identifying users associated with the user account may be initially defined during an account setup or account on-boarding process when a user subscribes to network connectivity services (e.g., home internet connectivity services, cellular network services, or the like).

Process 500 may also include determining user devices associated with the user account (block 530). For example, policy server 255 may identify user devices 210 (e.g., user devices 210 that may communicate via base station 215) based on the user account information received in block 510, and information stored by account user device repository 420. Information identifying user devices 210 associated with the user account may be initially defined during an account setup or account on-boarding process when a user subscribes to cellular network services.

Process 500 may further include determining user devices connected to a router/AP associated with the user (block 540). For example, policy server 255 may identify a particular router/AP 245 associated with the user based on the user information received in block 510 and information stored by user router/AP information repository 410. In some implementations, the user may provide an ID of router/AP 245, or an application installed on admin device 205 may obtain this information. Policy server 255 may query the identified router/AP 245 for hardware identifiers of user devices 210 connected to a particular router/AP 245. For example, policy server 255 may communicate with local policy enforcement component 250 based on information stored by user router/AP information repository 410 needed to communicate with local policy enforcement component 250 (e.g., an IP address, a hardware identifier of local policy enforcement component 250, authentication information, etc.). Based on receiving the query, local policy enforcement component 250 may output a report that identifies the hardware identifiers of user devices 210 connected to router/AP 245.

Process 500 may also include outputting information regarding the determined users and user devices for display on the admin device (block 550). For example, policy server 255, may output, via UI module 450, information regarding the users and the user devices 210 associated with the user account and connected to local policy enforcement component 250 for display on admin device 205. As described in greater detail below with respect to FIG. 6, admin device 205 may display information regarding user devices 210 to permit the user to link particular users with particular user devices 210.

Process 500 may further include receiving information linking particular users with particular user devices (block 560). For example, policy server 255 may receive, from admin device 205 and via UI module 450, information linking particular users, associated with the user account, to user devices 210 associated with the user account and/or user devices 210 connected to local policy enforcement component 250. An example of linking particular users with particular user devices 210, via UI module 450, is described in greater detail below with respect to FIG. 6.

Process 500 may also include receiving a policy set for a particular user and/or particular user device(s) (block 570). For example, policy server 255 may receive, from admin device 205 and via UI module 450, a policy set for a particular user and/or particular user devices 210 associated with the user. The policy set may include parental controls that indicate content (e.g., keywords, blacklisted websites, etc.) that user devices 210 may or may not receive. In some implementations, the policy set may also indicate a schedule of times at which the parental controls should be in effect. The user of admin device 205 may interact with policy server 255 via UI module 450 to define the policy set for user devices 210. An example of receiving a policy set for a user and/or user devices 210 is described in greater detail below with respect to FIG. 7.

Process 500 may further include storing or outputting the policy set (block 580). For example, policy server 255 may store the policy set or output the policy set in order for local policy enforcement component 250 and/or wireless policy enforcement 265 to enforce parental controls in the policy set. In some implementations, local policy enforcement component 250 may request, from policy server 255, a policy set associated with a particular user device 210 having a particular hardware identifier (e.g., a user device 210 connected to local policy enforcement component 250). Based on receiving the request, policy server 255 may identify the policy set associated with user device 210 having the particular hardware identifier, and may output the policy set to local policy enforcement component 250 (e.g., so that local policy enforcement component 250 can implement the policies when transmitting traffic to and/or from user device 210 via router/AP 245). In some implementations, policy server 255 may output the policy set to wireless policy enforcement component 265 so that wireless policy enforcement component 265 may implement the policies when transmitting traffic to and/or from user device 210 via base station 215.

Figure 6:
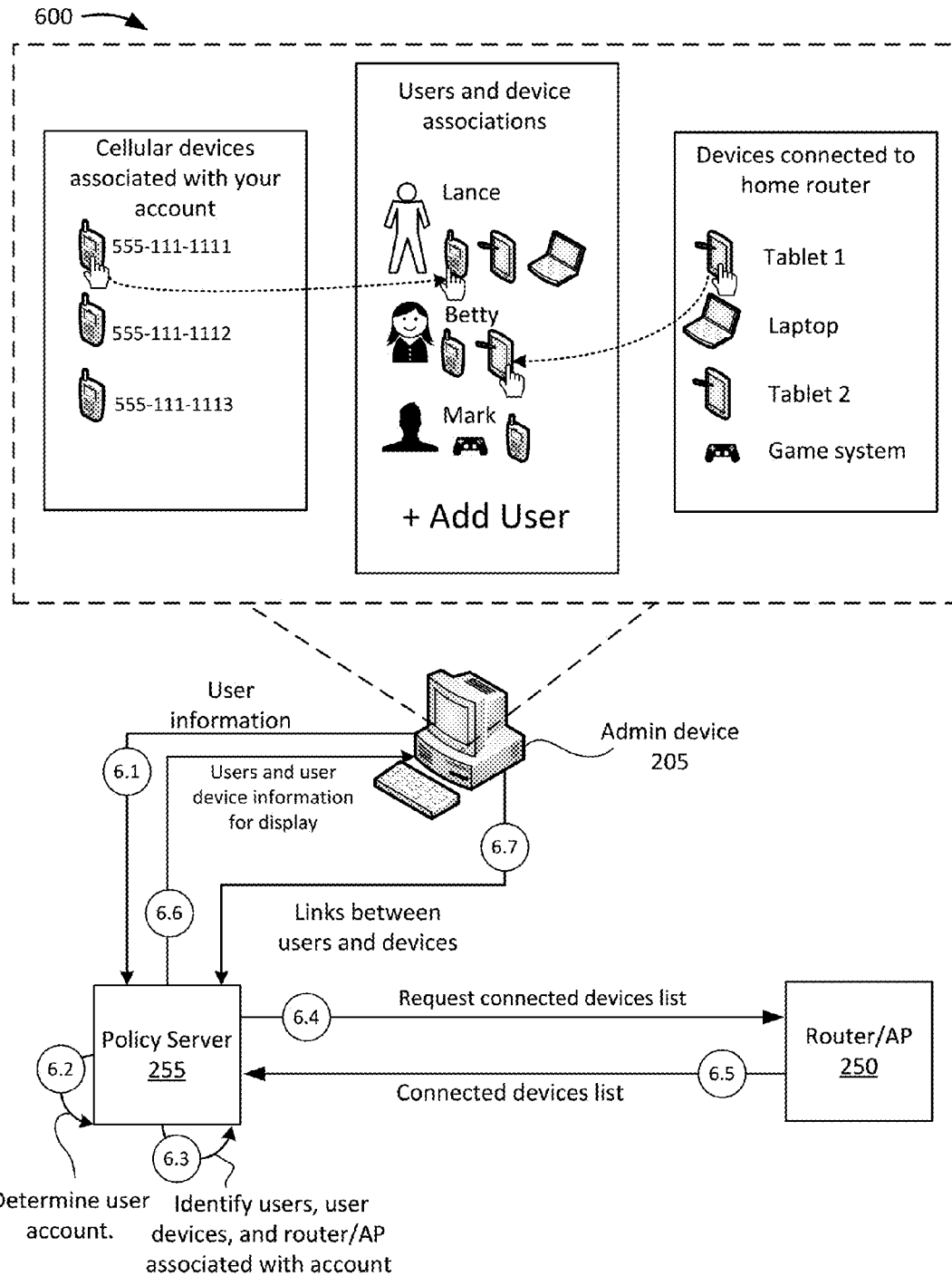
FIGS. 6 and 7 illustrate an example implementation for defining parental controls for particular users and user devices.
Figure 7:
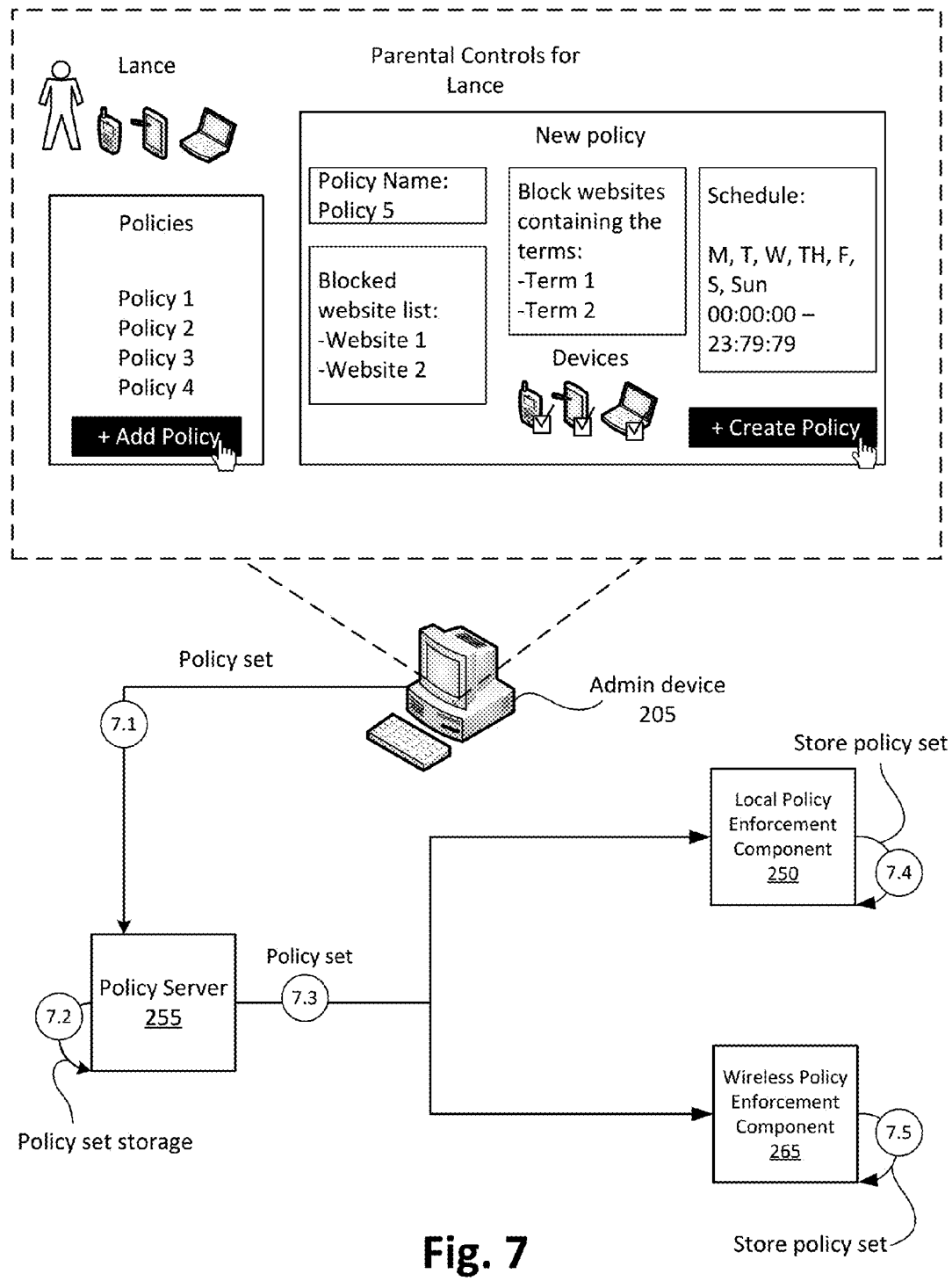

FIGS. 6 and 7 illustrate an example implementation for defining parental controls for particular users and user devices. As shown in FIG. 6, admin device 205 may output user information to policy server 255 (arrow 6.1). For example, admin device 205 may output the user information when a user of admin device 205 logs in to a parental control management system associated with policy server 255. Based on receiving the user information, policy server 255 may determine a user account associated with the user information (arrow 6.2). Policy server 255 may also identify users, user devices 210, and a local policy enforcement component 250 associated with the user account (arrow 6.3). For example, policy server 255 may identify cellular user devices 210 associated with the user account. Policy server 255 may then request a list, from local policy enforcement component 250, identifying user devices 210 connected to local policy enforcement component 250 (arrow 6.4), and local policy enforcement component 250 may output the list identifying the connected user devices 210 (arrow 6.5). For example, local policy enforcement component 250 may output a hardware identifier list, such as a list of MAC addresses, of the user devices 210 connected to local policy enforcement component 250.

As further shown in FIG. 6, policy server 255 may output, to admin device 205 (at 6.6), information identifying the users associated with the account, the user devices 210 associated with the account (e.g., cellular user devices 210), and the user devices 210 connected to the local policy enforcement component 250 associated with the account. Admin device 205 may display the information identifying the users, the cellular user devices 210, and the user devices 210 connected to router/AP 245 (as shown in example interface 600). The user of admin device 205 may then assign particular user devices 210 (e.g., cellular user devices 210 and/or user devices 210 connected to router/AP 245) to particular users. For example, to assign a user device 210 to a particular user, the user of admin device 205 may drag an icon representing user device 210 to an icon representing a particular user. Further, the user may select an option to add additional users to the account and/or remove existing users from the account. Based on the assignments inputted by the user via interface 600, admin device 205 may output information identifying the assignments (arrow 6.7), and policy server 255 may store information identifying the assignments of particular user devices 210 to particular users.

Referring to FIG. 7, the user of admin device 205 may define parental controls for a particular user and for particular user devices 210 associated with the user. In the example of FIG. 7, the user of admin device 205 may access a parental control management screen for the particular user "Lance" as shown interface 700. The parental control management screen may include a list of currently defined parental control sets (e.g., policy sets), and an option to add a new policy set for the user. When the user selects to add a new policy set, admin device 205 may display options to permit the user to select rules that define a how local policy enforcement component 250 and/or wireless policy enforcement component 265 filter traffic destined for user devices 210 associated with the user. For example, the user may add particular websites to a blacklist or a whitelist. Additionally, or alternatively, the user may indicate that websites having particular terms should be blocked. In some implementations, the user may input a schedule in which the policy set should be in effect. In some implementations, the user may select particular user devices 210, associated with the user, for which the policy set should be enforced. For example, the user may select cellular user devices 210 and/or non-cellular user devices 210 currently or previously connected to router/AP 245.

Once the user has completed creating the policy set, admin device 205 may output the policy set to policy server 255, and information linking the policy set to the selected user devices 210 for which the policy set should be enforced (arrow 7.1). Policy server 255 may then store the policy set and the information linking the policy set to the selected user devices 210 (arrow 7.2). Policy server 255 may also output the policy set and the information linking the policy set to the selected user devices 210 to local policy enforcement component 250 and wireless policy enforcement component 265. Local policy enforcement component 250 and wireless policy enforcement component 265 may then each store the policy set (arrows 7.4 and 7.5) so that the policy set can be enforced whether user devices 210 communicate via either router/AP 245 or base station 215.

While a particular example is shown in FIGS. 6 and 7, the above description is merely an example implementation. In practice, other examples are possible from what is described above in FIGS. 6 and 7. Also, while a particular format of interface 600 and interface 700 is shown, in practice, interface 600 and interface 700 may have a different format and appearance than what is shown in FIGS. 6 and 7.

Figure 8A:
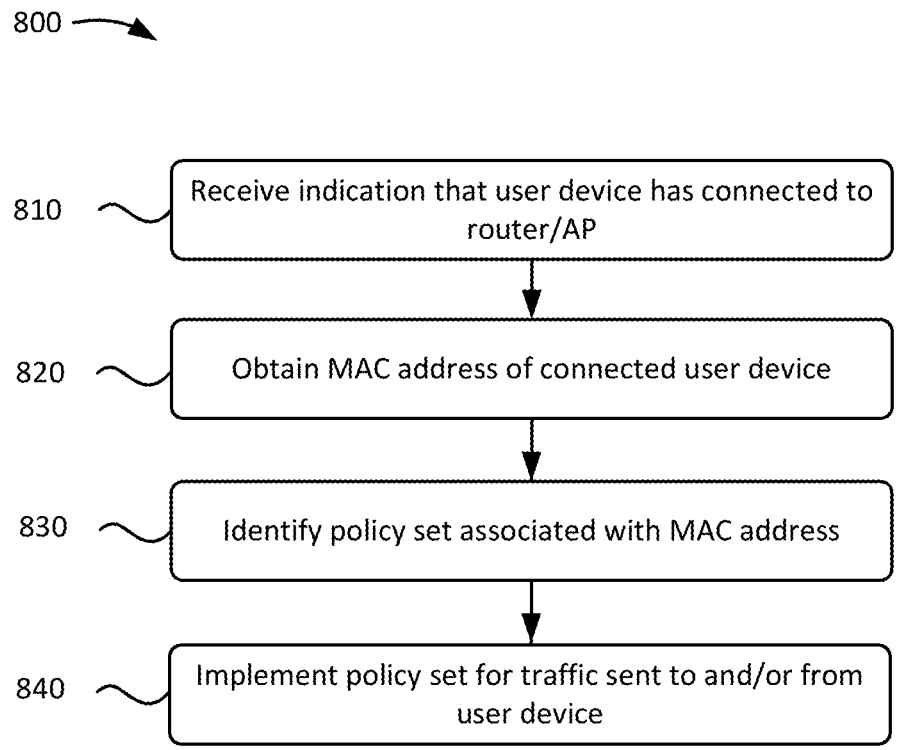
FIG. 8A illustrates a flowchart of an example process for obtaining parental controls for user devices connected to a router/access point.

FIG. 8A illustrates a flowchart of an example process 800 for obtaining parental controls for user devices connected to a router/AP. In some implementations, process 800 may be performed by local policy enforcement component 250. In some implementations, some or all of blocks of process 800 may be performed by one or more other devices.

As shown in FIG. 8A, process 800 may include receiving an indication that a user device has connected to a router/AP (block 810). For example, local policy enforcement component 250 may receive an indication when user device 210 has connected to router/AP 245 (e.g., when user device 210 has entered a wireless communication rang of router/AP 245, when user device 210 has been plugged in to router/AP 245, when user device 210 has been powered on, etc.).

Process 800 may also include obtaining the MAC address of the connected user device (block 820). For example, when user device 210 connects to router/AP 245, router/AP 245 may obtain the MAC address of user device 210 and output the MAC address to local policy enforcement component 250.

Process 800 may further include identifying a policy set associated with the MAC address (block 830). For example, local policy enforcement component 250 may look up the MAC address in a storage of local policy enforcement component 250 to identify a policy set associated with user device 210 based on the MAC address of user device 210. In some implementations, local policy enforcement component 250 may look up the MAC address in policy repository 320 to identify the policy set associated with the MAC address. If a MAC address is not found locally, local policy enforcement component 250 may obtain policy information from policy server 255 (e.g., as described in FIG. 8B).

Process 800 may also include implementing the policy set for traffic sent to and/or from the user device (block 840). For example, local policy enforcement component 250 may implement the policy set (e.g., parental controls) to prevent user device 210 from receiving and/or requesting particular blocked content identified in the policy set (e.g., content from particular webpages, applications, etc.).

Figure 8B:
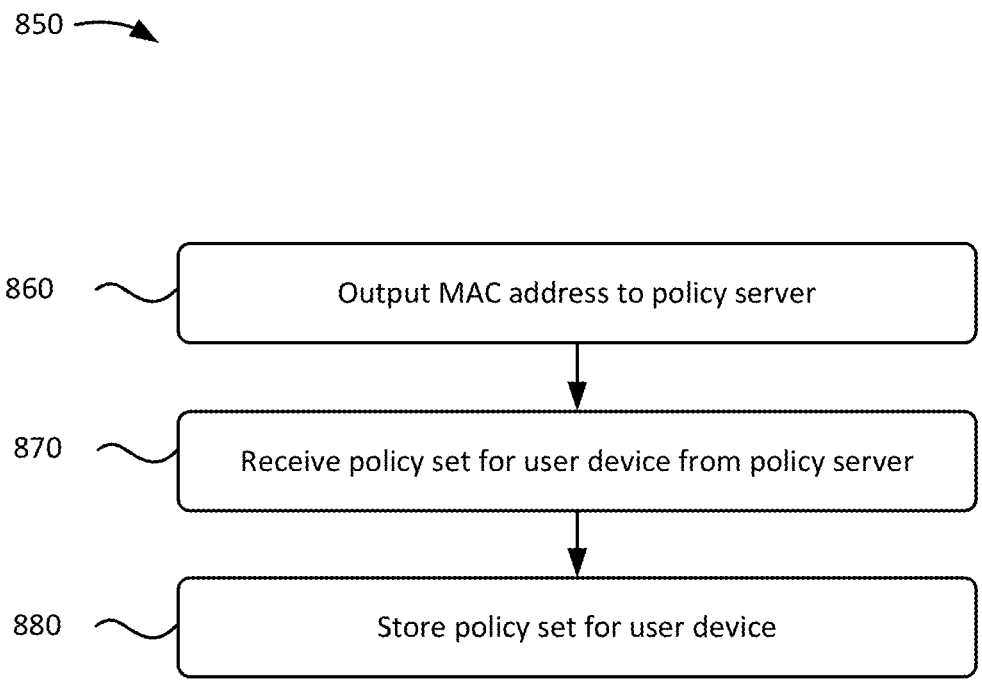
FIG. 8B illustrates a flowchart of an example process for identifying a policy set associated with a hardware identifier.

Referring to FIG. 8B, process 850 illustrates an example flowchart for identifying a policy set associated with a hardware identifier when local policy enforcement component 250 is not locally storing the hardware identifier of user device 210. For example, local policy enforcement component 250 may not be locally storing the hardware identifier of user device 210 when user device 210 is not associated with an account of router/AP 245. As described below, a policy set of user device 210 may be enforced by local policy enforcement component 250 even when user device 210 is connected to router/AP 245 but when user device 210 is not associated with an account of router/AP 245. Some or all of blocks of process 850 may correspond to process block 830 as described above in FIG. 8A.

As shown in FIG. 8B process 850 may include outputting the MAC address to a policy server (block 860). For example, local policy enforcement component 250 may output the MAC address of the connected user device 210 to policy server 255 as part of a request to receive one or more policy sets for user device 210.

Process 800 may also include receiving a policy set for the user device from the policy server (block 870). For example, based on receiving the MAC address, policy server 255 may identify one or more policy sets associated with user device 210 based on the MAC address. Policy server 255 may output the policy set(s) to local policy enforcement component 250.

Process 800 may further include storing the policy set for the user device (block 880). For example, local policy enforcement component 250 may store the policy set so that when user device 210 subsequently connects to router/AP 245, local policy enforcement component 250 may identify the policy set without the need to request the policy set from policy server 255. In some implementations, local policy enforcement component 250 may also request policy server 255 to "push" updates to the policy set(s) for user device 210 to local policy enforcement component 250.

Figure 9:
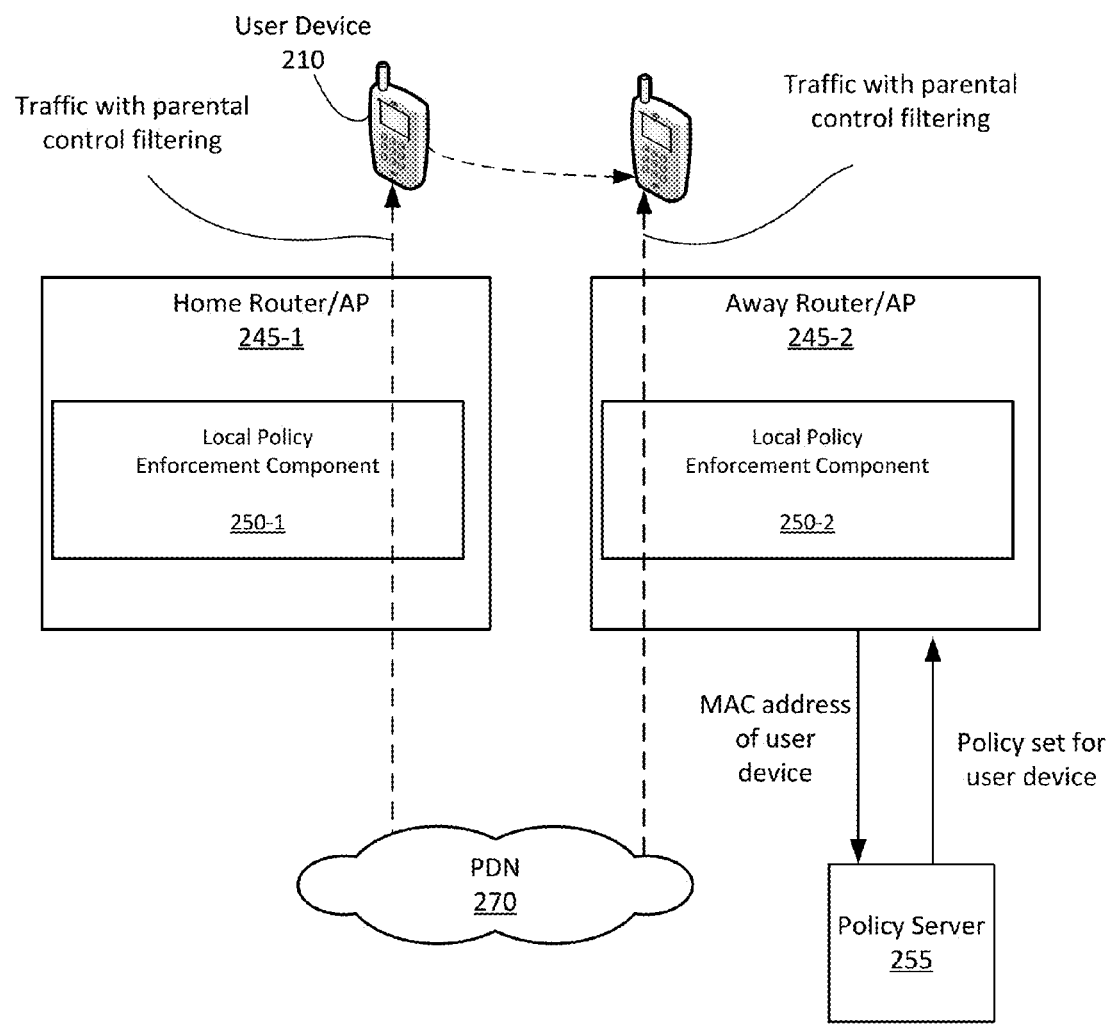
FIG. 9 illustrates an example implementation for enforcing a consistent set of parental controls when a user device connects to different local area networks.

FIG. 9 illustrates an example implementation for enforcing a consistent set of parental controls when a user device connects to different local area networks. In. FIG. 9, user device 210 may be associated with a "home" router/AP 245-1 (e.g., a router/AP 245 that implements a LAN at a residence or home location of a user of user device 210). In FIG. 9, assume that a local policy enforcement component 250-1 associated with home router/AP 245-1 stores a policy set for user device 210. For example, local policy enforcement component 250-1 may store the policy set for user device 210 when an administrator of home router/AP 245-1 defines the policy set for user device 210. Also, policy server 255 may store the policy set for user device 210. Local policy enforcement component 250-1 may filter traffic destined for user device 210 when user device 210 is connected to home router/AP 245-1.

As shown in FIG. 9, user device 210 may travel to within connection range of an "away" router/AP 245-2 (e.g., a router/AP 245 that implements a LAN at a different location than the user's home location). In FIG. 9, assume that local policy enforcement 250-2 does not store a policy set for user device 210. When user device 210 connects to away router/AP 245-2, local policy enforcement component 250-2 may output, to policy server 255, the hardware identifier (e.g., MAC address) of user device 210.

Policy server 255 may determine a policy set (e.g., parental controls) associated with the hardware identifier, and output the policy sets to local policy enforcement component 250-2. As traffic is transmitted to user device 210, local policy enforcement component 250-2 may filter traffic in accordance with parental controls of the same policy set as the policy set enforced by local policy enforcement component 250-1. As a result, the same set of parental controls may be enforced whether user device 210 connects to PDN 270 via home router/AP 245-1 or away router/AP 245-2. In some implementations, local policy enforcement component 250-2 may purge the policy set of user device 210 when user device 210 does not connect to away router/AP 245-2 within a threshold period of time. In some implementations, local policy enforcement component 250-2 may request policy server 255 to provide local policy enforcement 250-2 with updates to parental controls for user device 210.

Figure 10:
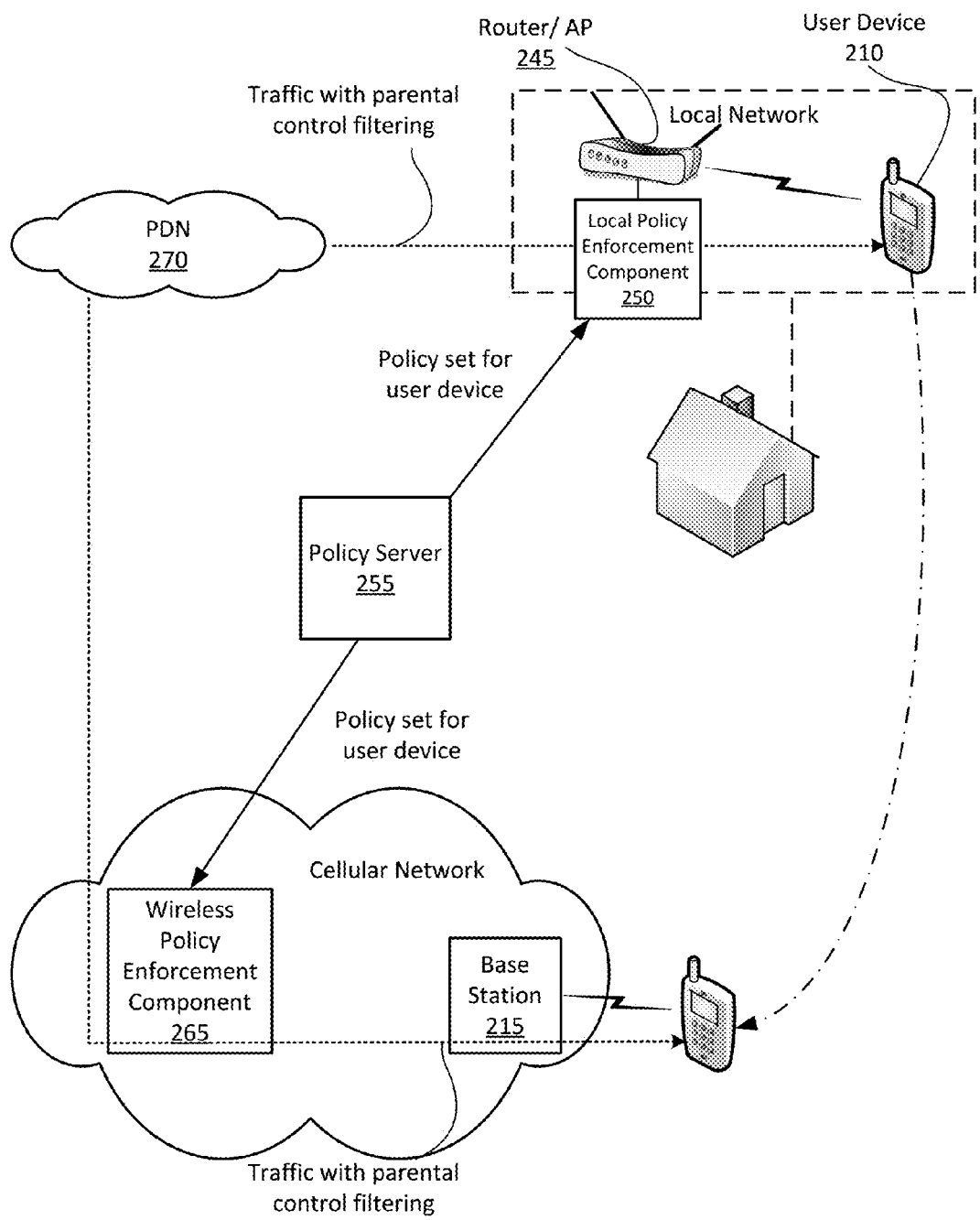
FIG. 10 illustrates an example implementation for enforcing parental controls for a user device when the user device is connected to either a local or cellular network.

FIG. 10 illustrates an example implementation for enforcing parental controls for a user device when the user device is connected to either a local or cellular network. As shown in FIG. 10, policy server 255 may "push" a policy set for user device 210 to local policy enforcement component 250 and wireless policy enforcement component 265. For example, policy server 255 may push the policy set when an administrator of user device 210 (e.g., a parent or guardian of a user of user device 210) has defined or updated parental controls for user device 210. As shown in FIG. 10, local policy enforcement component 250 may filter traffic in accordance with the policy set (e.g., parental controls) when user device 210 is connected to a local network and associated with router/AP 245.

When user device 210 travels outside of the local network (e.g., outside of a communications range of router/AP 245), user device 210 may connect with base station 215 associated with a cellular network. When connected to the cellular network, wireless policy enforcement component 265 may identify the same policy set (e.g., parental controls) for user device 210 based on a hardware identifier of user device 210 (e.g., an IMSI, IMEI, mobile device number, etc.). Wireless policy enforcement component 265 may filter traffic destined for user device 210 in accordance with the same parental controls. As a result, parental controls may be enforced when transmitting traffic to user device 210 regardless of whether user device 210 is connected to a local network or a cellular network. In some implementations, user device 210 may include software that may receive parental controls from policy server 255, and locally enforce the parental controls.

In some implementations, local policy enforcement component 250 may identify a policy set for user device 210 based on a hardware identifier that can be obtained via local networking protocols (e.g., a MAC address of user device 210, a Bluetooth radio ID, etc.), and wireless policy enforcement component 265 may identify the policy set of user device 210 based on a hardware identifier that can be obtained via cellular networking protocols (e.g., an IMSI, IMEI, mobile device number, etc.). In some implementations, policy server 255 may generate a link between multiple hardware identifiers associated with a single user device 210 so that the same policy set may be identified via different hardware identifier types.

Figure 11:
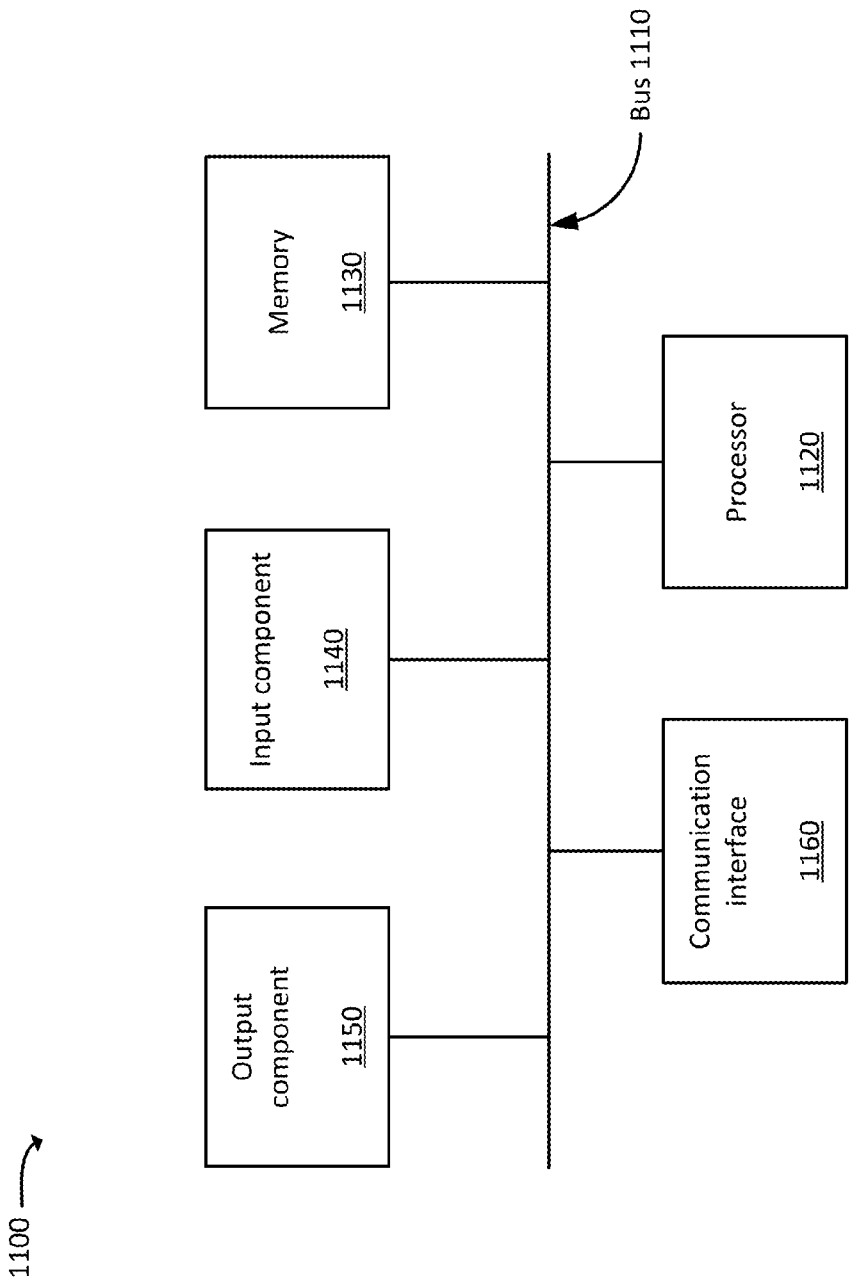
FIG. 11 illustrates example components of one or more devices, according to one or more implementations described herein.

FIG. 11 is a diagram of example components of device 1100. One or more of the devices described above (e.g., with respect to FIGS. 1, 2, 3A, 4, 6, 7, 9. and 10) may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, a while series of blocks have been described with regard to FIGS. 5, 8A, and 8B the order of the blocks and/or signal flows may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in 1, 2, 3A, 4, 6, 7, 9. and 10), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   identifying, by a device, a policy set associated with a user device;
   outputting, by the device, the policy set to a first network device associated with a first network,
      the outputting causing the first network device to prevent traffic, transmitted via the first network device when the user device is connected to the first network, from being forwarded to the user device, in accordance with the policy set;
   outputting, by the device, the policy set to a second network device associated with a second network,
      the second network being different from the first network,
      the outputting causing the second network device to prevent traffic, transmitted via the second network device when the user device is connected to the second network, from being forwarded to the user device, in accordance with the policy set;
   receiving, from the first network device, an update to the policy set;
   pushing the update to the policy set to the second network device,
      the pushing causing the second network device to prevent traffic, transmitted via the second network device when the user device is connected to the second network, from being forwarded to the user device, in accordance with the updated policy set;
   receiving, by the device and from an administrative device, account information via a portal or website associated with the device;
   identifying, by the device, the first network device based on the account information; and
   requesting, by the device and based on identifying the first network device, a list of hardware identifiers of devices connected to the first network device.

2. The method of claim 1, wherein the policy set relates to a parental control setting.

3. The method of claim 1, wherein the first network is a local area network, and wherein the second network is a wireless telecommunications network.

4. The method of claim 1, further comprising:
   outputting information identifying the user device associated with a particular hardware identifier, of the list of hardware identifiers, for display on the administrative device;
   receiving, from the administrative device and based on outputting the information identifying the user device, information identifying the policy set for the user device,
      wherein the information identifying the policy set corresponds to user inputs received by the administrative device; and
   storing information linking the hardware identifier to the policy set,
      wherein identifying the policy set is based on storing the information linking the hardware identifier to the policy set.

5. The method of claim 1, further comprising:
   receiving a request, including a hardware identifier associated with the user device, from the first network device when the user device connects to the first network device and when the first network device does not store the policy set associated with the user device, wherein the identifying of the policy set is based on the hardware identifier included in the request, wherein the outputting of the policy set to the first network device is based on the request from the first network device.

6. The method of claim 1, wherein the first network device includes, or is communicatively coupled to, a local area network (LAN) router, and
   wherein the second network device includes, or is communicatively coupled to, a packed data network gateway (PGW).

7. A system comprising:
   a non-transitory memory device storing a plurality of processor-executable instructions; and
   a processor configured to execute the processor-executable instructions, wherein executing the processor-executable instructions causes the processor to:
      receive, from a first network:
         a policy set associated with a user device, and
         a hardware identifier associated with the user device, wherein the first network includes a first network device that prevents traffic, transmitted via the first network and destined for the user device, from being forwarded to the user device, in accordance with the policy set;

push the received policy set and the hardware identifier to a second network, the second network being different from the first network, the pushing causing a second network device, associated with the second network, to identify the user device using the hardware identifier, and prevent traffic, transmitted via the second network and destined for the identified user device, from being forwarded to the identified user device, in accordance with the policy set;

receive account information via a portal or website;

identify the first network device based on the account information;

request, based on identifying the first network device, a list of hardware identifiers connected to the first network device, wherein executing the processor-executable instructions, to receive the hardware identifier of the user device, causes the processor to receive the hardware identifier based on requesting the list of hardware identifiers;

receive, from the first network, an update to the policy set; and push the update to the policy set to the second network, the pushing causing the second network device to prevent traffic, transmitted via the second network and destined for the user device, from being forwarded to the user device, in accordance with the updated policy set.

8. The system of claim 7, wherein the policy set relates to a parental control setting.

9. The system of claim 7, wherein the first network is a local area network, and wherein the second network is a wireless telecommunications network.

10. The system of claim 7, wherein executing the processor-executable instructions further causes the processor to:

output information identifying the user device associated with the hardware identifier for display on the administrative device;

receive, from the administrative device and based on outputting the information identifying the user device, information identifying the policy set for the user device, wherein the information identifying the policy set corresponds to user inputs received by the administrative device; and store information linking the hardware identifier to the policy set, wherein identifying the policy set is based on storing the information linking the hardware identifier to the policy set.

11. The system of claim 7, wherein executing the processor-executable instructions, to receive the hardware identifier, causes the processor to receive the receive hardware identifier when the user device connects to the first network device and when the first network device does not store the policy set associated with the hardware identifier.

12. The system of claim 7, wherein the first network device includes, or is communicatively coupled to, a local area network (LAN) router.

13. The system of claim 12, wherein the second network device includes, or is communicatively coupled to, a packed data network gateway (PGW).

14. A method, comprising:

receiving, from a first network:

a policy set associated with a user device, and a hardware identifier associated with the user device, wherein the first network includes a first network device that prevents traffic, transmitted via the first network and destined for the user device, from being forwarded to the user device, in accordance with the policy set;

pushing the received policy set and the hardware identifier to a second network, the second network being different from the first network, the pushing causing a second network device, associated with the second network, to identify the user device using the hardware identifier, and prevent traffic, transmitted via the second network and destined for the identified user device, from being forwarded to the identified user device, in accordance with the policy set;

receiving account information via a portal or website;

identifying the first network device based on the account information;

requesting, based on identifying the first network device, a list of hardware identifiers connected to the first network device, wherein receiving the hardware identifier of the user device includes receiving the hardware identifier based on requesting the list of hardware identifiers;

receiving, from the first network, an update to the policy set; and pushing the update to the policy set to the second network, the pushing causing the second network device to prevent traffic, transmitted via the second network and destined for the user device, from being forwarded to the user device, in accordance with the updated policy set.

15. The method of claim 14, wherein the policy set relates to a parental control setting.

16. The method of claim 14, wherein the first network is a local area network, and wherein the second network is a wireless telecommunications network.

17. The method of claim 14, further comprising:

outputting information identifying the user device associated with the hardware identifier for display on the administrative device;

receiving, from the administrative device and based on outputting the information identifying the user device, information identifying the policy set for the user device, wherein the information identifying the policy set corresponds to user inputs received by the administrative device; and storing information linking the hardware identifier to the policy set, wherein identifying the policy set is based on storing the information linking the hardware identifier to the policy set.

18. The method of claim 14, wherein the hardware identifier is received when the user device connects to the first network device and when the first network device does not store the policy set associated with the hardware identifier.

19. The method of claim 14, wherein the first network device includes, or is communicatively coupled to, a local area network (LAN) router.

20. The method of claim 19, wherein the second network device includes, or is communicatively coupled to, a packed data network gateway (PGW).

* * * * *